United States Patent Office 3,284,509
Patented Nov. 8, 1966

3,284,509
HALOALKYL HYDROXYALDEHYDES
Horace R. Davis, Roseville, Minn., assignor to Minnesota Mining and Manufacturing Company, St. Paul, Minn., a corporation of Delaware
No Drawing. Original application Apr. 16, 1962, Ser. No. 173,808, now Patent No. 3,164,610, dated Jan. 5, 1965. Divided and this application Feb. 24, 1964, Ser. No. 354,197
3 Claims. (Cl. 260—602)

This application is a division of application S.N. 173,808 filed February 16, 1962, now U.S. Patent No. 3,164,610.

This invention relates to new and useful fluorinated oxetanes, to intermediates therefor, and to methods for making the same.

It is an object of this invention to produce bactericidal fluorinated compounds. A further object of the invention is to produce unsaturated fluorinated tertiary alcohols. Another object of the invention is to produce fluorinated hydroxyaldehydes. A still further object of the invention is to produce intermediates for the production of unsaturated fluorinated tertiary alcohols. Yet a further object of the invention is to produce oxetanes convertible to unsaturated fluorinated tertiary alcohols. Other objects will become apparent hereinafter. Simmons and Wiley in the Journal of the American Chemical Society, vol. 82, pages 2288–2296 (1960), describe condensation reactions of certain fluoroketones with alcohols under basic conditions to give hemiketals and ketals and also carbanion condensations of fluoroketones to produce tertiary alcohols. Also, Knunyants et al. in Zhur Vsesoyus. Khim. Obshchestva im. D. I. Mendeleeva 5, 112–3 (1960), describe the reaction of hexafluoroacetone with certain organic compounds having oxygen-containing activating groups.

In accordance with the above and other objects of the invention it has been discovered that fluorinated ketones react with vinyl ethers to produce fluorinated oxetanes which are convertible to unsaturated fluorinated tertiary alcohols.

The fluorinated ketones employed in the process of the invention have the formula:

wherein A and B are the same or different lower alkyl radicals having exclusively halogen atoms of the group of fluorine and chlorine on the α-carbon atoms, at least one of the said halogen atoms being fluorine. Typical of such compounds are perfluoro acetone (i.e. hexafluorodimethyl ketone), perfluoro methyl ethyl ketone, perfluoro dibutyl ketone, and the like perfluorinated ketones, and bis(chlorodifluoromethyl) ketone, bis(dichlorofluoromethyl) ketone, 1,1,3-trichlorotrifluoroacetone and the like chlorofluoro ketones. It is believed that these substances are sufficiently well known in the art to require no further description. The term lower alkyl is to be understood as referring to radicals having 1 through 7 carbon atoms.

The vinyl ethers employed as intermediates to produce the compounds of the invention are represented by the formula:

wherein R is a member of the group consisting of alkyl radicals having from 1 to 18 carbon atoms, aryl radicals having from 6 to 10 carbon atoms and cycloalkyl radicals having 5 to 6 carbon atoms.

The active hydrogen atoms present in groups such as hydroxyl, aldehyde, carboxylic, sulfonic, sulfinic and sulfenic acid, and derivatives such as amides, so-called enolizable hydrogens activated by adjacent carbonylgroups, primary and secondary amino groups, hydrazine groups and aliphatic nitro and nitroso groups are of an active type which is generally to be avoided. Groups which do not interfere, since they possess no active hydrogen, include, for example, halogens, alkyl, alkylene, aromatic nitro, alkoxy and aryloxy groups. Simple ester groups, e.g., acetate and benzoate, serve to protect hydroxyl groups and render them innocuous.

Illustrative unsaturated materials suitable for use in the process of the invention include methyl vinyl ether, ethyl vinyl ether, β-chloroethyl vinyl ether, butyl vinyl ether, octyl vinyl ether, dodecyl vinyl ether, octadecyl vinyl ether, myristyl vinyl ether, phenyl vinyl ether, chlorophenyl vinyl ether, naphthyl vinyl ether, cyclohexyl vinyl ether and the like.

The process of the invention comprises bringing the desired vinyl ether and desired fluorinated ketone together in a suitable vessel and reacting the mixture at a temperature in the range of about 20° to 100° C. for a few hours and then isolating the product. No catalyst, diluent or other material is necessary to effect the reaction which proceeds very readily and is sometimes slightly exothermic. It will be understood, of course, that not all reactants interact with equal ease. The pressure during the reaction is the autogenous pressure in the vessel and may be up to about 100 atmospheres but is usually less.

The reaction occurs thus:

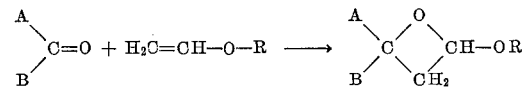

wherein groups A, B and R are as heretofore defined. The oxetane rearranges on further heating either when the reaction is prolonged or after isolation, to produce an unsaturated tertiary alcohol:

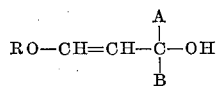

wherein R, A and B have the same definitions. These alcohols are found to possess bactericidal activity, e.g., toward *Bacillus subtilis*.

When hydrolyzed by water the oxetanes are converted to substituted β-hydroxy propionaldehydes:

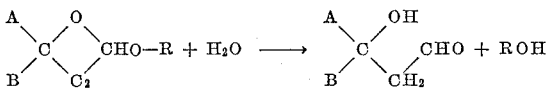

wherein A, B and R are as above defined, and which in turn can be reduced to 1,3-glycols or oxidized to β-hydroxy acids of novel structures. It is thus seen that the oxetanes of the invention are valuable intermediates in the production of unsaturated tertiary alcohols and also of hydroxy propionaldehydes.

Having now generally described the invention, it is now more particularly illustrated by examples showing the best mode presently contemplated of practicing the invention. Where not otherwise specified parts are by weight, temperatures in degrees Centigrade and pressures in millimeters of mercury.

*Example 1*

To 107 parts of 2-chloroethyl vinyl ether in a glass vessel are added 199 parts of bis(chlorodifluoromethyl) ketone. There is some exotherm and a reflux condenser is desirable and a cooling bath may be convenient. The mixture is subsequently refluxed for three hours using a steam bath and then fractionated. 2-(2-chloroethoxy)-

4,4-bis(chlorodifluoromethyl) oxetane is obtained boiling at 104°–106° C. at 11 mm. $n_D^{27}=1.4231$, and a slightly higher boiling fraction (110° C. at 11 mm.), 1,1-bis(chlorodifluoromethyl)-6-chloro-4-oxa-hex-2-en-1-ol, is obtained having $n_D^{27}=1.4400$. These two substances, in spite of the closeness in boiling point, can be separated very readily by their differences in chemical behavior since the latter is soluble in aqueous sodium hydroxide and the oxetane is not. The higher boiling material decolorizes potassium permanganate in acetone. The reactions and infra-red absorption spectra support the structures indicated by the names.

Analysis of 2(2-chloroethoxy)-4-bis(chlorodifluoromethyl) oxetane. Calculated for $C_7H_7Cl_3F_4O_2$: 27.5% C; 24.9% F. Found: 27.7% C; 25.3% F.

Example 2

A portion of about 10 parts of 2-methoxy 4,4-bis-(chlorodifluoromethyl) oxetane prepared as described in Example 4 is heated in a glass vessel at 100° C. (on a steam bath) for 18 hours. It is found to have been converted to the unsaturated alcohol, 1,1-bis(chlorodifluoromethyl)-4-oxa-pent-2-en-1-ol, and is now soluble in aqueous sodium hydroxide and decolorizes potassium permanganate in acetone.

Example 3

A portion of 6.5 parts of 2-(2-chloroethoxy)-4,4-bis-(chlorodifluoromethyl)oxetane is heated with 120 parts of 2 N aqueous hydrochloric acid for 2 hours with intermittent shaking. The oily organic phase gradually becomes yellow but does not dissolve. It is separated from the aqueous layer and distilled under reduced pressure to provide 2,2-bis(chlorodifluoromethyl)-2-hydroxy propionaldehyde boiling at about 68° to 73° C. at 7 mm. Hg pressure, $n_D^{27}=1.4180$, and soluble in dilute aqueous sodium hydroxide. Infrared absorption spectroscopy shows bands at 2.95 and 5.75 microns corresponding to hydroxyl and carbonyl groups. This aldehyde shows bactericidal activity. For this purpose, it is dispersed in water and applied where desired, for example, to disinfect glassware.

Calculated for $C_5H_4Cl_2F_4O_2$: 24.7% C; 31.3% F. Found: 24.8% C; 31.2% F.

Example 4

The procedure of Example 1 is repeated employing bis(chlorodifluoromethyl)ketone and methyl vinyl ether in molar ratio of 1:1.5 heated at 100° C. for 2 hours. Distillation provides a lower boiling fraction of 2-methoxy-4,4-bis(chlorodifluoromethyl) oxetane boiling at about 54° C. at 7 mm. Hg pressure, $n_D^{27}=1.3959$.

Calculated for $C_6H_6Cl_2F_4O_2$: 28.0% C; 29.6% F. Found: 28.5% C; 29.7% F. The higher boiling fraction which is soluble in dilute alkali is 1,1-bis(chlorodifluoromethyl)-4-oxa-pent-2-en-1-ol boiling at 72° C. at 7 mm. Hg pressure, $n_D^{27}=1.4176$. It is purified by vapor phase chromatography for analysis.

Calculated for $C_6H_6C_2F_4O_2$: 28.0% C; 29.6% F. Found: 28.4% C; 29.7% F. Nuclear magnetic resonance measurements confirm the structure.

Example 5

When the oxetane of Example 4 is hydrolyzed by heating with aqueous hydrochloric acid by the procedure of Example 3, the same hydroxyaldehyde is obtained and characterized by reaction with Tollen's reagent, with the Fuchsin aldehyde reagent and by spectroscopic absorption analysis and physical properties.

Example 6

When the procedure of Example 1 is repeated employing the same stoichiometric proportions of bis-(fluorodichloromethyl) ketone and p-chlorophenyl vinyl ether the product comprises 2(p-chlorophenoxy)-4-bis(fluorodichloromethyl)oxetane which is converted by the procedure of Example 2 to 1,1-bis(fluorodichloromethyl)-3-(p-chlorophenoxy)-prop-2-en-1-ol which also forms part of the reaction product. Hydrolysis of the above produced oxetane with aqueous hydrochloric acid by the procedure of Example 3 produces 2,2-bis(fluorodichloromethyl)-2-hydroxypropionaldehyde.

Example 7

When the procedure outlined above is repeated employing bis(perfluoropropyl)ketone and vinyl cyclohexyl ether the products are 2(cyclohexyloxy)-4,4-bis(perfluoropropyl)oxetane and 1,1-bis(perfluoropropyl)-3-cyclohexyl-prop-2-en-1-ol. Hydrolysis of the oxetane produces 2,2 - bis(perfluoropropyl) - 2 - hydroxypropionaldehyde.

Example 8

2-methoxy-4,4-bis(trifluoromethyl)oxetane is prepared by the procedure of Example 4 employing hexafluoroacetone as the ketone and is therein hydrolyzed by the procedure of Example 3 to give 2,2-bis(trifluoromethyl)-2-hydroxypropionaldehyde which is found to possess bactericidal activity. An aqueous dispersion is applied to a surface for disinfection purposes.

When this procedure is repeated employing octadecyl vinyl ether and hexafluoroacetone, 2-octadecyloxy-4,4-bis-(trifluoromethyl) oxetane is obtained which is then hydrolyzed to the same aldehyde as above.

What is claimed is:

1. As compositions of matter, hydroxyaldehydes having the structure:

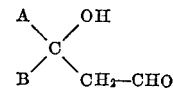

wherein each of A and B is a perhaloalkyl group of 1 to 7 carbon atoms fully substituted on the α-carbon atom by halogen atoms selected from the group consisting of fluorine and chlorine at least one of said halogen atoms being fluorine.

2. 2,2-bis(chlorodifluoromethyl)-2hydroxypropionaldehyde.

3. 2,2-bis(trifluoromethyl)-2-hydroxypropionaldehyde.

References Cited by the Examiner
UNITED STATES PATENTS 3,125,581  1/1965  Coffman et al. _____ 260—601

LEON ZITVER, *Primary Examiner.*

R. H. LILES, *Assistant Examiner.*